US006689501B2

(12) United States Patent
Stone et al.

(10) Patent No.: US 6,689,501 B2
(45) Date of Patent: Feb. 10, 2004

(54) COMPOSITE ION EXCHANGE MEMBRANE FOR USE IN A FUEL CELL

(75) Inventors: Charles Stone, West Vancouver (CA); David A. Summers, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 390 days.

(21) Appl. No.: 09/866,387

(22) Filed: May 25, 2001

(65) Prior Publication Data

US 2003/0059657 A1 Mar. 27, 2003

(51) Int. Cl.[7] .......................... H01M 8/02; H01M 8/10; H01M 2/16

(52) U.S. Cl. .......................... 429/30; 429/33

(58) Field of Search ...................... 429/30, 33; 204/296

(56) References Cited

U.S. PATENT DOCUMENTS

| | | | |
|---|---|---|---|
| 2,965,697 A | 12/1960 | Duddy | 136/146 |
| 3,692,569 A | 9/1972 | Grot | 117/138.8 |
| 4,262,041 A | 4/1981 | Eguchi et al. | 427/245 |
| 4,341,615 A | 7/1982 | Bachot et al. | 204/296 |
| 4,360,434 A | 11/1982 | Kawaguchi et al. | 210/500.2 |
| 4,433,082 A | 2/1984 | Grot | 524/755 |
| 4,453,991 A | 6/1984 | Grot | 156/94 |
| 4,469,744 A | 9/1984 | Grot et al. | 428/246 |
| 4,518,650 A | 5/1985 | Grot et al. | 428/286 |
| 4,604,170 A | 8/1986 | Miyake et al. | 204/98 |
| 4,714,663 A | 12/1987 | Arnold, Jr. et al. | 429/101 |
| 4,849,311 A | 7/1989 | Itoh et al. | 429/192 |
| 4,865,930 A | 9/1989 | Kindler et al. | 429/192 |
| 4,902,308 A | 2/1990 | Mallouk et al. | 55/16 |
| 4,954,388 A | 9/1990 | Mallouk et al. | 428/198 |
| 4,976,860 A | 12/1990 | Takahashi et al. | 210/500.28 |

(List continued on next page.)

FOREIGN PATENT DOCUMENTS

| | | | |
|---|---|---|---|
| EP | 143 606 B1 | 6/1985 | |
| EP | 498 348 B1 | 8/1992 | |
| EP | 798 791 A2 | 10/1997 | |
| EP | 875 524 A2 | 11/1998 | |
| EP | 1236066 | * 12/2002 | ............ H01M/8/02 |
| GB | 2 052 382 A | 1/1981 | |
| GB | 2 091 166 A | 7/1982 | |
| JP | 62-064834 | 3/1987 | |
| JP | 63-099246 | 4/1988 | |
| JP | 02-82457 | 3/1990 | |
| JP | 06-29032 | 2/1994 | |
| JP | 06-342666 | 12/1994 | |
| JP | 06-342667 | 12/1994 | |
| JP | 08-12775 | 1/1996 | |
| JP | 08-180890 | 7/1996 | |
| WO | WO 87/06395 | 10/1987 | |
| WO | WO 97/41168 | 11/1997 | |
| WO | WO 98/50457 | 11/1998 | |
| WO | WO 98/51733 | 11/1998 | |
| WO | WO 99/10165 | 3/1999 | |

OTHER PUBLICATIONS

Abstract of JP 59–219334, espacenet database, Dec. 10, 1984.

(List continued on next page.)

*Primary Examiner*—Mark Ruthkosky
(74) *Attorney, Agent, or Firm*—Seed IP Law Group PLLC

(57) ABSTRACT

A composite membrane for use in a fuel cell membrane electrode assembly comprises a porous polymeric substrate and an impregnant partially filling the substrate such that the substrate comprises a first region having pores substantially filled with the impregnant, and a second substantially porous region. The impregnant comprises a cation exchange material. The cation exchange material covers one surface of the substrate in a dense surface layer, contiguous with the first region of the substrate. The substrate has greater than 10% residual porosity, and the composite membrane is substantially gas impermeable and has at least one substantially porous major surface.

22 Claims, 8 Drawing Sheets

U.S. PATENT DOCUMENTS

| | | | |
|---|---|---|---|
| 5,082,472 A | 1/1992 | Mallouk et al. | 55/16 |
| 5,183,545 A | 2/1993 | Branca et al. | 204/252 |
| 5,288,384 A | 2/1994 | Banerjee | 204/252 |
| 5,346,924 A | 9/1994 | Giuffrida | 521/28 |
| 5,425,865 A | 6/1995 | Singleton et al. | 204/252 |
| 5,447,636 A | 9/1995 | Banerjee | 210/638 |
| 5,498,639 A | 3/1996 | Wei et al. | 521/27 |
| 5,521,023 A | 5/1996 | Kejha et al. | 429/142 |
| 5,523,181 A | 6/1996 | Stonehart et al. | 429/192 |
| 5,531,899 A | 7/1996 | Yen et al. | 210/638 |
| 5,545,475 A | 8/1996 | Korleski | 428/306.6 |
| 5,602,185 A | 2/1997 | Stone et al. | 521/27 |
| 5,647,894 A | 7/1997 | Ohara et al. | 96/13 |
| 5,658,669 A | 8/1997 | Althoff et al. | 428/421 |
| 5,684,192 A | 11/1997 | Stone et al. | 562/826 |
| 5,702,503 A | 12/1997 | Tse Tang | 95/45 |
| 5,773,480 A | 6/1998 | Stone et al. | 521/27 |
| 5,814,372 A | 9/1998 | Moya | 427/245 |
| 5,834,523 A | 11/1998 | Steck et al. | 521/27 |
| 5,858,264 A | 1/1999 | Ichino et al. | 252/62.2 |
| 5,863,645 A | 1/1999 | Misoo et al. | 428/314.2 |
| 5,922,492 A | 7/1999 | Takita et al. | 429/249 |
| 5,985,942 A | 11/1999 | Steck et al. | 521/27 |
| 6,042,958 A | 3/2000 | Denton et al. | 429/30 |
| 6,042,959 A | 3/2000 | Debe et al. | 429/33 |
| 6,110,333 A | 8/2000 | Spethmann et al. | 204/252 |
| 6,130,175 A | 10/2000 | Rusch et al. | 442/77 |
| 6,156,451 A | 12/2000 | Banerjee et al. | 429/134 |
| 6,387,230 B1 * | 5/2002 | Murphy | 204/296 |
| 6,497,977 B1 * | 12/2002 | Stone | 429/129 |

OTHER PUBLICATIONS

Abstract of JP 60–069140, espacenet database, Apr. 19, 1985.
Abstract of JP 61–060729, espacenet database, Mar. 28, 1986.
Abstract of JP 61-246394, Nov. 1, 1986.
Abstract of JP 62–05582, espacenet database, Mar. 10, 1987.
Abstract of JP 62–064834, espacenet database, Mar. 23, 1987.
Abstract of JP 62–131038, espacenet database, Jun. 13, 1987.
Abstract of JP 63–037134, espacenet database, Feb. 17, 1988.
Abstract of JP 63–122521, espacenet database, May 26, 1988.
Abstract of JP 63–42667, espacenet database, Dec. 13, 1994.
Abstract of JP 01–022932, espacenet database, Jan. 25, 1989.
Abstract of JP 02–085387, espacenet database, Mar. 26, 1990.
Abstract of JP 02–291608, espacenet database, Dec. 3, 1990.
Abstract of JP 02–291607, espacenet database, Dec. 3, 1990.
Abstract of JP 03–087096, espacenet database, Apr. 11, 1991.
Abstract of JP 03–095871, espacenet database, Apr. 22, 1991.
Abstract of JP 03–153740, espacenet database, Jul. 1, 1991.
Abstract of JP 06–271687, espacenet database, Sep. 27, 1994.
Abstract of JP 10–057783, espacenet database, Mar. 3, 1998.
Bahar et al., "Effective Selection and Use of Advanced Membrane Electrode Power Assemblies," *Journal of New Materials for Electrochemical Systems* 2:179–182, 1999.
Glad and Irgum, "Synthesis of Reactive Composite Membranes From Celgard 2400 and Methacrylate Monomers," *Journal of Membrane Science* 67:289–293, 1992.
Lei et al., "Chemical Preparation of Conductive Polypyrrole–Polytetrafluoroethene Composites," *Polymers for Advanced Technologies* 4:124–132, Jun. 1992.
Liu and Martin, "Ior Transporting Composite Membranes II. Ion Transport Mechanism in Nafion–Impregnated Gore–Tex Membranes," *J. Electrochem. Soc.* 137(2):510–515, Feb. 1990.
Nouel and Fedkiw, "Nafion–based Composite Polymer Electrolyte Membranes," *Electrochem. Acta* 45:2381–2387, 1997.
Penner and Martin, "Electronically Conductive Composite Polymer Membranes," *J. Electrochem. Society: Electrochemical Science and Technology* 133:310–315, Feb. 1986.
Penner and Martin, "Ion Transporting Composite Membranes I. Nafion–Impregnated Gore–Tex," *J. Electrochem. Society* 132(2):514–515, 1985.
Taylor and Wilemski, "The Effect of Support Morphology on Supported Membrane Performance," *Proceedings of the Electrochemical Society* 86(13):93–101, 1986.
Verbrugge et al., "Composite Membranes for Fuel–Cell Applications," *AIChE Journal* 38(1):93–100, Jan. 1992.

* cited by examiner

COMPOSITE ION EXCHANGE MEMBRANE FOR USE IN A FUEL CELL

FIELD OF THE INVENTION

The present invention relates to composite ion exchange membranes, and in particular, composite ion exchange membranes for use in solid polymer electrolyte fuel cells.

BACKGROUND OF THE INVENTION

Ion exchange membranes are used in a variety of applications. For example, ion exchange membranes are components of electrochemical cells such as solid polymer electrolyte fuel cells, chlor-alkali electrolysis cells, and batteries. Ion exchange membranes are also employed in diffusion dialysis, electrodialysis, pervaporation, and vapor permeation applications. Anion, cation, and amphoteric ion exchange membranes are known.

Ion exchange membranes may comprise dense polymer films. For example, Nafione® membranes are commercially available dense film perfluorosulfonic acid ion exchange membranes suitable for use in solid polymer electrolyte fuel cells and chlor-alkali electrolysis cells. As another example, commonly assigned U.S. Pat. No. 5,422,411, incorporated herein by reference in its entirety, describes dense ion exchange membranes comprising polymeric compositions comprising substituted $\alpha,\beta,\beta$-trifluorostyrene monomers. Current dense film ion exchange membranes suffer certain practical limitations for use in electrochemical cells such as fuel cells, such as cost and thickness, for example.

For ease of handling, for example, in the preparation of membrane electrode assemblies ("MEA") for use in fuel cells, the mechanical strength of the membrane in the dry state and hydrated state is important. In electrochemical applications, such as electrolytic cells and fuel cells, the dimensional stability of the membrane during operation is also important. Further, to improve performance, it is generally desirable to reduce membrane thickness and to decrease the equivalent weight of the membrane electrolyte, both of which tend to decrease both the mechanical strength and the dimensional stability in the hydrated state.

One approach for improving mechanical strength and dimensional stability relative to dense film ion exchange membranes is through the use of a porous reinforcing support material. For example, an unsupported membrane can be preformed and then laminated to the reinforcing support, or a dense film may be formed directly on a surface of the reinforcing support. The reinforcing support is typically selected so that it imparts some mechanical strength and dimensional stability relative to the dense film ion exchange membrane. Composite membranes (discussed below) have also been laminated with reinforcing supports to form reinforced membranes.

Laminating or otherwise combining a reinforcing support with a dense film membrane or a composite membrane, while increasing mechanical strength and dimensional stability, is not totally beneficial. One reason is that the reinforcing support tends to defeat the purpose of a thin membrane by increasing the overall thickness. Another reason, which also leads to reduced ionic conductivity, is due to the "shadowing" effect of the reinforcing support. The shortest path for an ion through a membrane is a perpendicular path from one surface to the other surface. Reinforcing supports are typically made from materials that are not ion-conductive. Those parts of the reinforced ion exchange membrane where an ion cannot travel perpendicularly across the membrane, but must take a circuitous route around the reinforcing support, are "shadowed" areas. The presence of shadowed areas in the reinforced membrane reduces the effective area of the membrane that actively conducts ions, thereby decreasing the effective ionic conductivity of the membrane.

Another approach for improving mechanical strength and dimensional stability in ion exchange membranes is to impregnate an ion-conductive material into a porous substrate material to form a composite membrane. Such composite ion exchange membranes prepared by impregnating commercially-available microporous polytetrafluoroethylene (ePTFE) film (Gore-Tex®; W.L. Gore & Associates, Inc., Elkton, Md.) with Nafion®, have been described in the Journal of the Electrochemical Society, Vol. 132, pp. 514–515 (1985). The major goal in the study was to develop a composite membrane with the desirable features of Nafion®, but which could be produced at a low cost. Similarly, U.S. Pat. Nos. 5,547,551, 5,599,614 and 5,635,041 describe composite membranes comprising microporous expanded PTFE substrates impregnated with Nafion®. Gore-Select® membranes (W.L. Gore & Associates, Inc., Elkton, Md.) are composite membranes comprising a microporous expanded PTFE membrane having an ion exchange material impregnated therein.

Composite membranes incorporating other porous substrate materials, such as polyolefins and poly(vinylidene fluoride) and other ion exchange materials, have also been described. For example, commonly assigned U.S. Pat. No. 5,985,942, incorporated herein by reference in its entirety, describes composite membranes comprising a porous substrate and, inter alia, ion exchange materials comprising substituted $\alpha,\beta,\beta$-trifluorostyrene polymers and copolymers.

Composite ion exchange membranes suitable for use in fuel cells, in addition to having suitable mechanical strength and dimensional stability, should also have suitable ionic conductivity and be substantially impermeable to gas reactants. To achieve these aims, current composite ion exchange membranes, such as the Gore-Select® membranes, are relatively thin and the microporous substrate is impregnated throughout with an ion exchange material. These composite ion exchange membranes are also typically uniform and integral, meaning a continuous impregnation of the microporous membrane such that no pin holes or other discontinuities exist within the composite structure.

While current composite ion exchange membranes developed for use in fuel cells have achieved a measure of success, there are still areas for additional improvement. First, as noted above, the microporous substrate is filled with ion exchange material. Generally speaking, the ion exchange material is the most expensive component of the composite. Thus, essentially the maximum cost of ion exchange material is incurred for a given thickness of microporous substrate in current composite ion exchange membranes for use in fuel cells. Second, current methods for producing such composite ion exchange membranes typically involve multiple coating steps to fully impregnate the substrate with ion exchange material. Alternatively, or in addition, such methods comprise steps for facilitating impregnation, such as ultrasonication, or adding surfactants to the impregnation solution. These steps increase the time, complexity, and cost of producing composite ion exchange membranes. This is particularly the case where surfactants are added to the impregnation solution, which generally necessitates an additional processing step to remove the surfactant before using the composite membrane in a fuel cell.

It is desirable to have a composite ion exchange membrane suitable for use in fuel cells that is less expensive and easier to produce than current composite ion exchange membranes and that provides comparable fuel cell performance.

SUMMARY OF THE INVENTION

A composite membrane and methods for making the composite membrane are provided. In one embodiment, the present composite membrane is an asymmetric composite membrane for use in a fuel cell membrane electrode assembly, and the composite membrane comprises:

(a) a porous polymeric substrate;

(b) an impregnant comprising a cation exchange material, the impregnant partially filling the substrate such that the substrate comprises a first region having pores substantially filled with the impregnant, and a second substantially porous region; and (c) a dense surface layer comprising the cation exchange material, the dense layer contiguous with the first region of the substrate, wherein the substrate has greater than 10% residual porosity, and the composite membrane is substantially gas impermeable and has a substantially porous major surface.

In another embodiment, the present composite membrane comprises:

(a) a porous polymeric substrate; and (b) an impregnant comprising at least one cation exchange material, the impregnant partially filling the substrate such that the substrate comprises a first region having pores substantially filled with the impregnant, and a second substantially porous region, wherein the substrate has greater than 10% residual porosity, and the composite membrane is substantially gas impermeable and has at least one substantially porous major surface.

An embodiment of the method of making the present composite membrane comprises:

(a) impregnating a porous polymeric substrate by contacting a first impregnant solution with one major surface of the substrate, the first solution comprising at least one polymer and a solvent; and (b) removing the solvent from the first solution by evaporation.

In another embodiment, the present composite membrane comprises:

(a) two porous polymeric substrates; and (b) an impregnant comprising at least one cation exchange material, the impregnant partially filling each of the substrates such that each substrate comprises a first region having pores substantially filled with the impregnant, and a second substantially porous region, each of the first regions in contact with the dense layer, wherein the composite membrane has greater than 10% residual porosity, is substantially gas impermeable, and has two substantially porous major surfaces.

Another embodiment of the method of making the present composite membrane comprises:

(a) impregnating a first porous polymeric substrate to form a first layer by contacting a first impregnant solution with one major surface of the first substrate, the first impregnant solution comprising at least one polymer and a solvent;

(b) removing the solvent from the first solution by evaporation;

(c) impregnating a second porous polymeric substrate to form a second layer by contacting a second impregnant solution with one major surface of the second substrate, the second impregnant solution comprising at least one polymer and a solvent;

(d) removing the solvent from the first solution by evaporation; and (e) laminating the first and second layers together.

The impregnant may comprise a polymer containing precursor substituents that can be converted into ion exchange substituents. Suitable precursor substituents include —SO$_2$X, —SO$_2$OR, —SR, —NRR', and —PO(OR)$_2$ (where X=Br, Cl, F; and R, R' can be alkyl or aryl). In such cases, the method for making the composite membrane may further comprise converting the precursor substituents to ion exchange substituents.

In making the present composite membrane, an embodiment of the present method comprises impregnating the porous substrate(s) with an impregnant comprising a polymer and then introducing ion exchange substituents into the polymer post-impregnation.

The present composite membrane may further comprise an electrochemically inert, hygroscopic material. The hygroscopic material may be present in the substrate material, the impregnant, the dense layer (if present), or any combination thereof. The impregnant may also further comprise compatible mixtures of non-ionic polymers, if desired.

In the present composite membrane the substrate may have greater than 15% residual porosity. For example, it may have between about 15% and about 20% residual porosity.

Membrane electrode assemblies and fuel cells comprising the present composite membrane are also provided.

DETAILED DESCRIPTION OF PREFERRED EMBODIMENTS

Figure 1A:
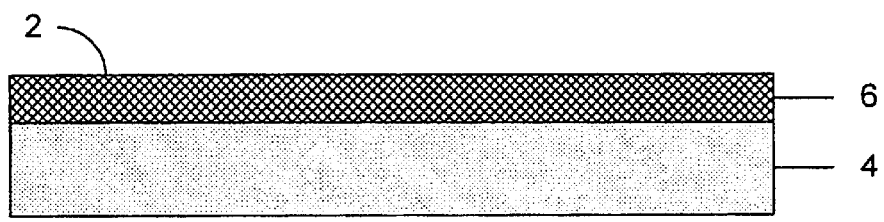
FIG. 1 is a schematic representation of embodiments of the present composite membrane.
Figure 1B:
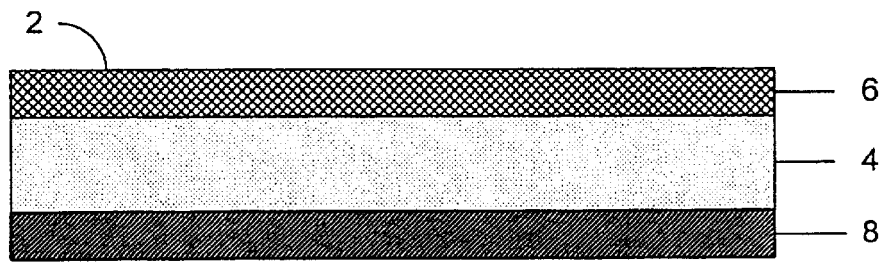
Figure 1C:
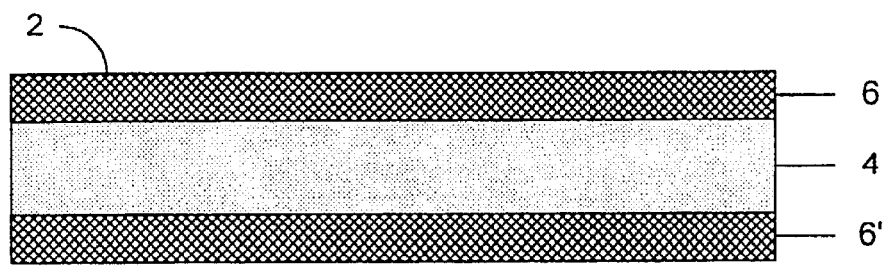
Figure 1D:
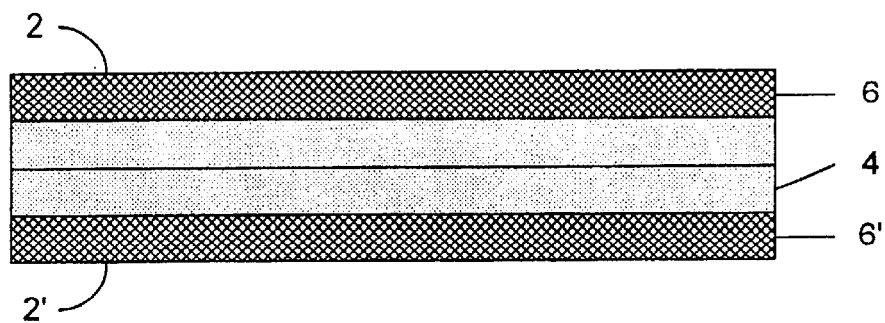

The present composite membrane comprises a porous substrate impregnated with an impregnant comprising an ion exchange material. The impregnant partially fills the substrate such that the substrate comprises a first region having pores substantially filled with the impregnant, and a second substantially porous region, and has greater than 10% overall residual porosity. The composite membrane is substantially gas impermeable and has at least one substantially porous major surface.

Suitable porous substrate materials are dependent on the application in which the composite membrane is to be used. The substrate material preferably has good mechanical properties, is chemically and thermally stable in the environment in which the composite membrane is to be used, and is tolerant of the solvent used with the ion exchange material for impregnation. Suitable substrates for fuel cell applications include porous polymeric materials. Suitable porous polymeric materials include hydrocarbons such as porous polyolefins, for example. Examples of such porous polyolefins include polyethylene, including ultra-high molecular weight polyethylene (UHMWPE), and polypropylene. Fluoropolymers and/or chlorinated polymers may also be suitable. In particular, perfluorinated porous polymeric materials, such as expanded polytetrafluoroethylene, for example, may be used. Other suitable porous polymeric materials include polyamides, polycarbonates, polyacrylates, polysulfones, copolyether esters, polyvinylidene fluoride, polyaryl ether ketones, and polybenzimidazoles. Copolymeric substrates such as, for example, poly (ethylene-co-tetrafluoroethylene) and poly (tetrafluoroethylene-co-hexafluoropropylene), may also be used.

If desired, the substrate may further comprise electrochemically inert materials that promote water retention in the composite membrane under normal operating conditions. Polymeric, non-polymeric or hydrogel materials may be suitable. For example, porous polyethylene/silica substrates may be used.

The nature and degree of porosity, pore size and thickness of the substrate used in the composite membrane can also be selected to suit the application. For example, for use of the composite membrane as an electrolyte in a fuel cell, the substrate thickness is typically selected to be in the range from about 10 $\mu$m to about 200 $\mu$m, preferably about 25 $\mu$m to about 50 $\mu$m, the average pore diameter can be about 0.1–5.0 $\mu$m, and the porosity can be from about 50% to about 98%, preferably about 75% to about 95%.

The impregnant comprises an ion exchange material. The ion exchange material may be a cation exchange material, an anion exchange material, or an ion exchange material containing both cation and anion exchange capabilities. Mixtures of ion exchange materials may also be employed as impregnants. Suitable ion exchange materials include, for example, perfluorosulfonic acid polymers, perfluorocarboxylic acid polymers, perfluorophosphonic acid polymers, styrenic ion exchange polymers, fluorostyrenic ion exchange polymers, polyarylether ketone ion exchange polymers, polysulfone ion exchange polymers, bis (fluoroalkylsulfonyl)imides, (fluoroalkylsulfonyl) (fluorosulfonyl)imides, polyvinyl alcohol, polyethylene oxides, divinyl benzene, metal salts with or without a polymer, and mixtures thereof. Of course, the suitability of a particular ion exchange material depends to a certain extent on the application for which the composite membrane is intended. Examples of suitable perfluorosulfonic acid polymers for use in fuel cell applications include Nafion® (E.I. DuPont de Nemours, Inc., Wilmington, Del., US), Flemion® (Asahi Glass Co. Ltd., Tokyo, JP), and Aciplex® (Asahi Chemical Co. Ltd., Tokyo, JP), which are commercially available perfluorosulfonic acid copolymers. Other examples of suitable perfluorosulfonic acid polymers for use in fuel cell applications include perfluorinated sulfonyl (co)polymers such as those described in U.S. Pat. No. 5,463,005.

Suitable fluorostyrenic polymers for fuel cell applications include ion exchange materials derived from substituted and unsubstituted fluorinated styrenes, such as α-fluorostyrenes, α,β-difluorostyrenes, α,α,β-trifluorostyrenes, and copolymers thereof. Examples of suitable fluorostyrenic polymers are described in commonly assigned U.S. Pat. Nos. 5,498,639, 5,602,185, 5,684,192, 5,773,480, 5,834,523, and 5,985,942, each of which is hereby incorporated herein by reference in its entirety.

The impregnant may comprise polymers containing precursor substituents which may be converted post-impregnation into ion exchange substituents. Generally, "precursor substituents" are substituents having latent ion exchange functionality that can be converted into ion exchanges groups, preferably in one or two reaction steps. For example, —SO$_2$X (where X=Br, Cl, F) and —SO$_2$OR (where R can be alkyl or aryl) are precursor substituents that may be converted to sulfonic acid substituents. Similarly, —SR substituents may also be readily converted into sulfonic acid substituents, as described in U.S. Pat. No. 5,830,962, which is incorporated herein by reference in its entirety. As another example, —NRR' substituents may be converted to quarternary ammonium salts. As a further example, —PO(OR)$_2$ substituents may be converted to phosphonic acid substituents. Conventional reaction conditions may be employed to convert the precursor substituents into ion exchange substituents, as will be apparent to persons skilled in the art.

The impregnant may comprise polymers having substituents that permit the introduction of ion exchange substituents in a post-impregnation step, as discussed in more detail below.

The impregnant may further comprise other components, if desired. For example, the impregnant may comprise an electrocatalyst composition. Suitable catalyst compositions include unsupported and supported catalysts comprising precious metals, transition metals, oxides thereof, alloys thereof, and mixtures thereof. The presence of electrocatalyst in the ion exchange layer of the composite membrane may be desirable for reducing reactant crossover, such as, for example, methanol in direct methanol fuel cell applications. Further, the electrocatalyst may provide for more effective ionomer-electrocatalyst interactions, thereby facilitating the oxidation and reduction of reactant gases.

The impregnant may further comprise electrochemically inert materials that promote water retention in the composite membrane under normal operating conditions. Polymeric, non-polymeric or hydrogel materials may be suitable. For example, the impregnant may further comprise particulate silica and/or fibrous silica, as described in U.S. Pat. No. 5,523,181, which is incorporated herein by reference, or a hydrogel comprising silicon oxides, such as described in Chemistry of Materials, Vol. 7, pp. 2259–2268 (1995). Other suitable such materials will be apparent to persons skilled in the art.

The impregnant may further comprise compatible mixtures of non-ionic polymers, such as polyarylether ketones or polysulfones, for example. Having non-ionic polymers in the impregnant may be advantageous in some applications. For example, non-ionic polymers in the impregnant may reduce the amount of methanol cross-over in direct methanol fuel cells.

Where a polymeric composition is used, the impregnant is typically introduced into the porous substrate via an impregnation solution comprising the impregnant in a suitable solvent. The choice of solvent will depend, in part, on both the composition of the impregnant and the composition of the porous substrate. Suitable solvents include, for example, water, alcohols, ketones, carbonates, tetrahydrofuran, acetonitrile N,N-dimethylformamide, N-methylpyrrolidone, dimethylsulfoxide, N,N-dimethylacetamide, and mixtures thereof. As used herein and in the appended claims, "solvent" means any suitable solvent or mixture of solvents.

Alternatively, the ion exchange material may comprise one or more monomers or oligomers that may be impregnated into the porous substrate and subsequently polymerized or otherwise chemically linked. Thus, as used herein and in the appended claims, "impregnant solution" includes ion exchange monomers, oligomers, polymers, and mixtures thereof in solvent, as well as neat ion exchange material monomers and/or oligomers. Note that where the impregnation solution comprises components in addition to the ion exchange material, such components need not be dissolved in the liquid phase. Thus, impregnation solutions may also be dispersions.

FIG. 1 is a schematic representation of embodiments of the present composite membrane.

In one embodiment, the impregnant partially fills the substrate of the present composite membrane such that the region having pores substantially filled with the impregnant extends into the thickness of the substrate from one major surface thereof. Membrane A of FIG. 1 is a schematic representation of this embodiment. In asymmetric composite membrane A, porous substrate 2 comprises region 4 having pores substantially filled with the impregnant and substantially porous region 6.

Another embodiment of the present composite membrane is schematically represented in FIG. 1 as membrane B. In asymmetric composite membrane B, porous substrate 2 comprises region 4 having pores substantially filled with the impregnant and substantially porous region 6. Layer 8 comprises a dense layer of ion exchange material, such as an polymer, for example, that is substantially contiguous with region 4.

Membrane C of FIG. 1 is a schematic representation of yet another embodiment of the present composite membrane. In membrane C, porous substrate 2 comprises region 4 having pores substantially filled with the impregnant and substantially porous regions 6 and 6', respectively.

An embodiment of the present method for making the foregoing embodiments of the present composite membrane comprises applying a layer of impregnant solution having a controlled thickness to a carrier support, and then bringing the coated support into contact with the porous substrate. Upon contact, the impregnant is drawn by a wicking action into the interior structure of the porous substrate. The solvent in the impregnant is then evaporated to produce a composite membrane.

Alternatively, an impregnant solution layer having a controlled thickness may be applied directly to a porous substrate material. The solvent would then be removed as described. Since the substrate material is also functioning as a carrier support, the applicability of this embodiment of the present method may be dependent upon the mechanical properties of the substrate material. For example, in continuous processes for coating rolls of substrate material, ePTFE may not be suitable since it may be stretched by the web tensioning equipment typically employed. In continuous processes employing this embodiment of the present method, substrates such as UHMWPE may be more appropriate.

The impregnant solution layer may be applied by conventional techniques capable of applying a layer having a controlled thickness to a substrate, such as forwarding roll coating, reverse roll coating, gravure coating, kiss coating, doctor blade coating or die coating, for example.

By controlling the thickness of the impregnant solution layer and/or its composition, the method may be applied to produce the foregoing embodiments of the present composite membrane. For example, for a given set of properties (pore size, porosity, thickness, etc.) of a particular porous substrate, it is possible to control the structure of the resulting composite membrane.

Without being bound by theory, as the impregnant solution layer is brought into contact with the porous substrate, it is drawn by a wicking action into the interior structure of the porous substrate from one side thereof. Subsequent evaporation of the solvent then tends to occur preferentially from the other side of the porous substrate. As a result, impregnant may continue to be drawn into the interior structure of the porous substrate as the solvent evaporates.

Thus, for a given composition of impregnant, the thickness of the impregnant solution layer may be chosen so that, upon evaporation of the solvent, the structure of the composite membrane may be selected as desired. For example, the thickness of the impregnant solution layer may be selected so that upon evaporation of the solvent, the impregnant is partially drawn into the porous substrate, resulting in a composite membrane having a dense polymer film layer on one side thereof (membrane B of FIG. 1). By selecting a thinner impregnant solution layer, for a given substrate material the impregnant may be drawn into the porous substrate such that substantially no discernable dense layer is present in the resultant composite membrane, and the region of the porous substrate having pores substantially filled with the impregnant is substantially in contact with one major surface of the porous substrate (membrane A of FIG. 1). By selecting a still thinner impregnant solution layer, for a given substrate material the impregnant may be drawn into the porous substrate such that, upon evaporation of the solvent, the region of the porous substrate having pores substantially filled with the impregnant is substantially within the interior of the porous substrate, with substantially porous regions on either side thereof (membrane C of FIG. 1).

Similarly, the composition of the impregnant solution may also be selected so as to produce the desired composite membrane. For example, the degree to which the impregnant solution is drawn into the interior structure of the porous substrate, and the amount of ion exchange material present in the composite membrane, is also determined by factors such as, for example, the concentration of ion exchange material in the impregnant solution, the viscosity of the impregnant solution, the porosity of the substrate, the thickness of the substrate and/or the pore size of the substrate. The appropriate conditions for impregnating a porous substrate to produce a desired composite membrane structure may readily be empirically determined for a given application.

Membrane D of FIG. 1 is a schematic representation of yet another embodiment of the present composite membrane. In this embodiment the composite membrane comprises two porous substrates, 2 and 2', respectively. The composite membrane also comprises region 4 having pores substantially filled with the impregnant and substantially porous regions 6 and 6', respectively. As shown in FIG. 1, region 4 of example D spans the interface region between porous substrates 2, 2'. In membrane D, porous substrates 2, 2 may be spaced apart from each other, in which case composite membrane D further comprises a dense film layer of ion exchange material, such as an polymer, for example, interposed between the porous substrates.

A method of making the foregoing embodiment of the present composite membrane comprises applying the method discussed above to form two intermediate composite membranes having the structure of membrane A in FIG. 1, then laminating them together to form the structure of membrane D. Alternatively, one or both of the intermediate composite membranes may have the structure of membrane B of FIG. 1. As a further alternative, a dense film layer could be interposed between the porous substrates. Lamination may be effected by known means, such as the application of heat and/or pressure, for example. The contacting surface of either or both of the intermediate composite membranes, and/or one or both surfaces of the dense film layer, if present, could be coated with solvent or ion exchange material solution, for example, to assist in the lamination process.

Alternatively, one or both of the porous substrates may be impregnated with impregnant solution, as discussed above, and then the impregnated substrate(s) brought together, followed by solvent evaporation to effect lamination. With some solvents it may be convenient to evaporate a portion of the solvent(s) in the impregnated substrate(s) before bringing them in contact, as this may facilitate subsequent lamination.

For example, a layer of impregnant solution may be applied to one surface of one porous substrate, and then a second porous substrate may be brought into contact with the same surface. The second porous substrate may also have an impregnant solution applied to one surface thereof before it is brought into contact with the first substrate, in which case the coated surfaces of the substrates should face each other, or it may be brought into contact with the first substrate in an unimpregnated state. In the former case, the method may further include interposing a dense film layer between the coated porous substrates. In the latter case, the method may further include applying a dense film layer onto the first coated substrate, applying a layer of impregnant solution onto the dense film layer, and then contacting the second porous substrate with the coated dense layer.

As a further alternative, one of the substrates may comprise an intermediate composite membrane having the structure of any of membranes A, B or C of FIG. 1. For example, the method may comprise applying a layer of impregnant solution to one surface of a porous substrate, and then applying an intermediate composite membrane to the same surface, followed by evaporating the solvent from the impregnant to effect lamination. As another example, the intermediate composite membrane may function as a carrier support, wherein a layer of impregnant solution may be applied to the composite membrane and then a porous substrate is impregnated by contacting it with the layer of impregnant solution. In either example, the method may also further comprise interposing a dense film layer between the intermediate composite membrane and the porous substrate.

If desired, the impregnant solution used in making the present composite membrane may comprise more than one ion exchange material.

Alternatively, the present composite membrane may be made by sequentially impregnating the porous substrate(s) with more than one layer of impregnant solution. This approach has the disadvantage that it involves multiple impregnation and solvent evaporation steps. However, it also permits the formation of layers of different ion exchange materials in the composite membrane, which may be desirable in some applications.

In the present method of making the present composite membranes, the impregnant (and dense film layer, if present) may comprise a polymeric composition, where ion exchange substituents can be:

(i) present in the polymeric composition prior to its impregnation into the substrate;
(ii) introduced post-impregnation through further reaction of the polymeric composition in the substrate; or
(iii) introduced via conversion of precursor substituents present in the polymeric composition, after impregnation.

Thus, the present method may further comprise the post-impregnation step of introducing ion exchange substituents into the composite membrane by further reaction of the impregnated polymeric composition or conversion of precursor substituents present therein.

If the ion exchange substituents are to be introduced via a post-impregnation conversion or reaction, the substrate should be selected such that it can withstand the post-impregnation treatment step. For example, in post-impregnation introduction of ion exchange substituents, the ion exchange substituents may be introduced into polymeric compositions having monomer units containing substituted and/or unsubstituted aryl substituents, via aromatic substitution of at least a portion of those units, after preparation of the composite membrane. For example, in polymeric compositions containing substituted and/or unsubstituted $\alpha,\beta,\beta$-trifluorostyrene units, pendent phenyl rings in the composite membrane can be conveniently sulfonated (see U.S. Pat. No. 5,422,411) to produce a composite cation exchange membrane. Similarly, such pendent phenyl rings (and other aryl substituents) may be phosphorylated, carboxylated, quaternary-aminoalkylated or chloromethylated, and further modified to include $-CH_2PO_2H_2$, $-CH_2NR_3^+$ (where R is an alkyl), or $-CH_2NAr_3^+$ (where Ar is a substituted or unsubstituted aryl group), and other substituents, to provide cation exchange or anion exchange composite membranes. Further still, the pendent aryl ring may contain a hydroxyl group which can be elaborated by known methods to generate $-OSO_3H$, $-OPO_2H_2$, and $-OPO_3H_2$ cation exchange sites on the composite membrane.

The approach in which the ion exchange functionality is introduced post-impregnation via conversion of a precursor substituent using simple post-impregnation procedures may be used. Composite membranes may be prepared from polymers containing precursor substituents that are subsequently converted into ion exchange substituents. For example, sulfonyl fluoride substituents ($-SO_2X$, X=Br, Cl, F) can be hydrolyzed to generate $-SO_3H$ cation exchange sites. In a typical hydrolysis reaction, the sulfonyl halide is converted to the free sulfonic acid functionality by treatment of the composite membrane with concentrated aqueous alkali metal hydroxide at elevated temperatures. This and other procedures for the conversion of precursor substituents into ion exchange substituents are well known to those skilled in the art.

In some instances, it may be desirable to introduce ion exchange substituents after preparation of the composite membranes, as described in (ii) and (iii) above. For example, where the preferred porous substrates are hydrophobic, the preparation of the composite membrane by first impregnating the substrate with an impregnant solution comprising a non-ionic polymer which is also essentially hydrophobic may lead to more facile and improved impregnation, which may increase processing efficiency.

The present composite membrane may further comprise an electrocatalyst layer associated with at least one of the major surfaces thereof. The electrocatalyst layer may further comprise an ion exchange material which may be the same ion exchange material used to impregnate the composite membrane, or different. The layer may be formed by applying a mixture of electrocatalyst and ion exchange material to one or both major surfaces of the composite membrane, for example. Other conventional techniques may also be used, such as chemical vapor deposition ("CVD"), combustion chemical vapor deposition ("CCVD"), sputtering, or precipitation employing hexachloroplatinic acid, for example. Other suitable techniques of forming an electrocatalyst layer will be apparent to persons skilled in the art. The same or different electrocatalyst compositions may be applied to each surface of the composite membrane, if desired. Where a mixture of electrocatalyst and ion exchange material is applied to both major surfaces of the composite membrane, a different electrocatalyst, ion exchange material, or both, may be applied to each surface. The electrocatalyst layer may also further comprise a hygroscopic material that promotes water retention, such as particulate silica or silica fibers, for example.

It should be noted that in the present composite membrane the substantially porous region may contain other material. For example, the substrate material in the substantially porous region of the present composite membrane may be at least partially coated with ion exchange material, and a portion of the available porosity may be filled with other components, as discussed above.

Figure 2:
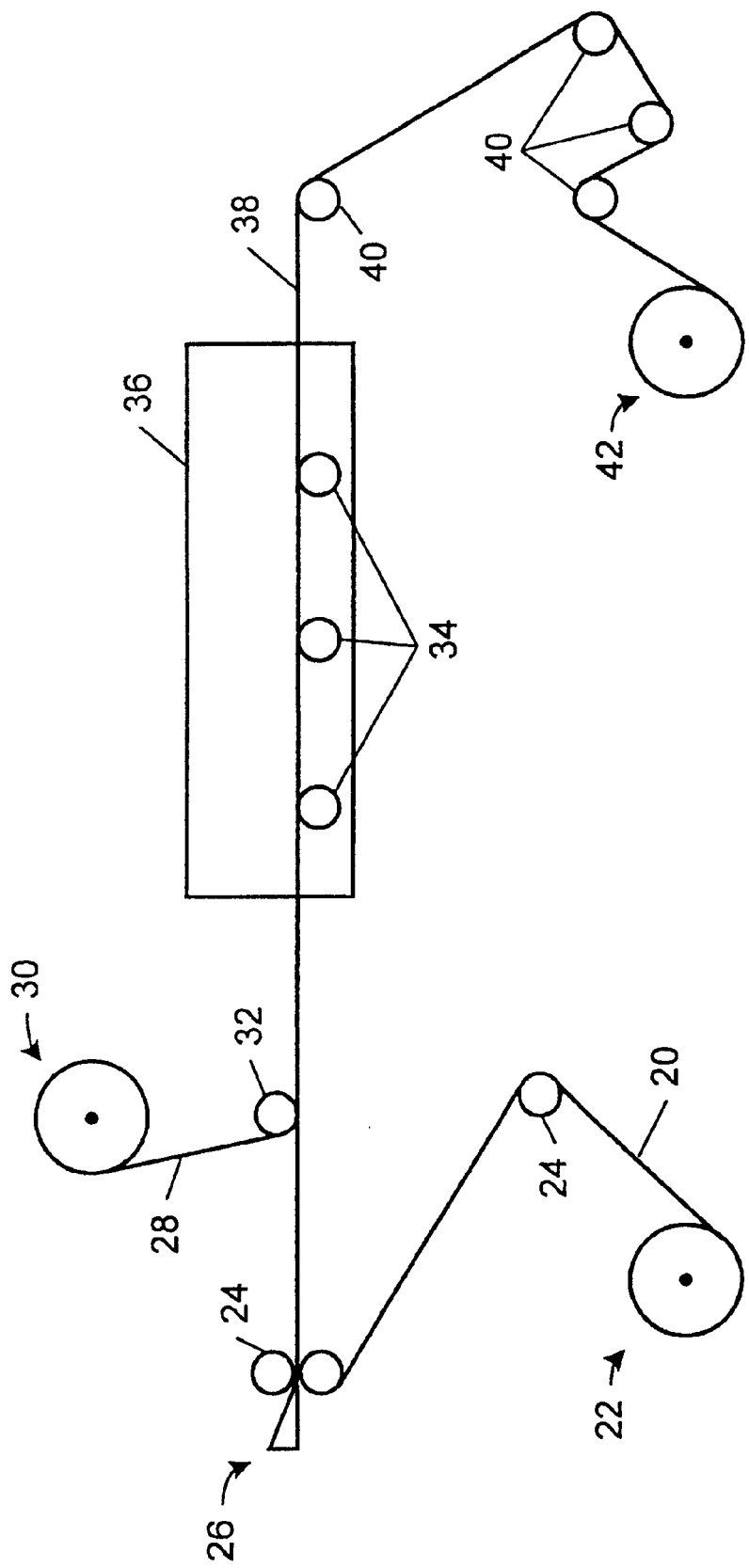
FIG. 2 is a schematic illustration of apparatus suitable for making the present composite membrane.

FIG. 2 is a schematic illustration of apparatus suitable for making the present composite membrane. Carrier support 20 is continuously fed from roller unwind station 22 via alignment and tension rollers 24 to coating station 26. An impregnant solution is applied as a layer of controlled thickness onto the surface of carrier support 20 by suitable coating means, such as, for example, a doctor blade. Substrate 28 is continuously fed from roller unwind station 30 to alignment roller 32 and contacts the coated carrier support 20 and is impregnated with impregnant solution. The impregnated substrate 28 and carrier support 20 are supported on transport rollers 34 through oven 36. The solvent in the impregnant solution is evaporated in oven 36 to produce composite membrane 38. Composite membrane 38 on carrier support 20 exiting oven 36 is then fed via alignment and tension rollers 40 and rolled up at wind-up station 42.

The apparatus of FIG. 2 could also be adapted as desired. By way of illustrative but not exhaustive examples, possible modifications include: incorporating other conventional coating means; eliminating the carrier support and applying the layer of impregnant solution directly to the substrate; including a further substrate unwind station for producing composite membranes having two substrate layers; and, incorporating further downstream stations for converting precursor substituents in polymeric impregnants into ion exchange substituents, or a station to introduce ion exchange substituents into the composite membrane, as discussed above. Other modifications to the apparatus of FIG. 2 will be apparent to those skilled in the art.

The following examples are for purposes of illustration and are not intended to limit the invention. Examples 1 and 2 describe the preparation of composite membranes in which porous, UHMWPE is used as the substrate. Example 3 sets forth the procedure for determining the residual porosity of composite membranes prepared as described in Example 2. Example 4 sets forth the procedure used to test the composite membranes, prepared as described in Example 2, as membrane electrolytes in a fuel cell.

EXAMPLE 1

A 50-cm×30-cm piece of carrier support (polypropylene-coated paper with a gloss finish; (Channeled Resources, Inc., Belleville, Ontario, Canada)) was placed flat on a polished metal casting table. Using a doctor blade set at a 200-$\mu$m gap, a layer of a Nafione solution (20% solids by weight, in water/ethanol/propanol) was applied to one surface of the carrier support. A 45 cm×25 cm piece of substrate (porous UHMWPE; approximately 25 $\mu$m thick, 83% porosity; DSM Solutech BV, Heerlen, The Netherlands) was then brought into contact with the Nafions solution layer such that no wrinkles or trapped air were present between the solution layer and the substrate. The substrate wetted immediately and became transparent. The metal table and impregnated substrate assembly was then placed in a circulating-air oven at 60° C. for 5 minutes to remove the solvent by evaporation. The assembly was removed from the oven and allowed to cool to room temperature. The dry composite membrane was removed from the carrier support as a translucent, mechanically strong, flexible film.

EXAMPLE 2

A roll (400 mm wide) of the carrier support used in Example 1 was fed through rollers of a reel-to-reel coater that included a doctor blade coating station, a second unwind station (for substrate), an oven section, tension control and a wind-up station. A roll of the substrate used in Example 1 was placed on the second unwind station. The leading edge of the substrate roll was fed under an alignment roller and attached (with adhesive tape) to the carrier support. The line speed of the coater was set to 1 m/min and the doctor blade was set at a 200-$\mu$m gap to apply a layer of the Nafion® solution used in Example 1 onto the surface of the carrier support. The substrate, upon contacting the applied Nafion® solution, was wetted and became transparent. The solvent was removed by evaporation in the oven section (65° C.) and the dry, translucent composite membrane and carrier support were rolled up in a continuous manner on the wind-up station.

Figure 3:
FIG. 3 is an SEM micrograph of one major surface of an embodiment of the composite membrane.
Figure 4:
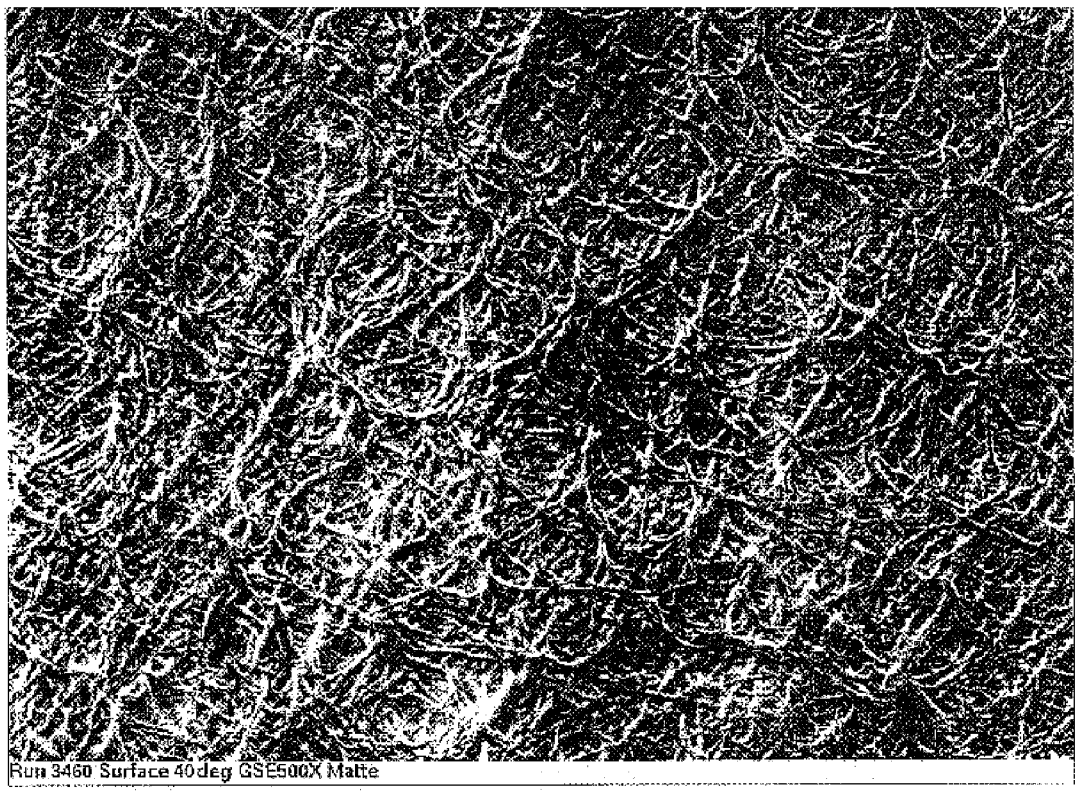
FIG. 4 is an SEM micrograph of the other major surface of the composite membrane of FIG. 3.
Figure 5:
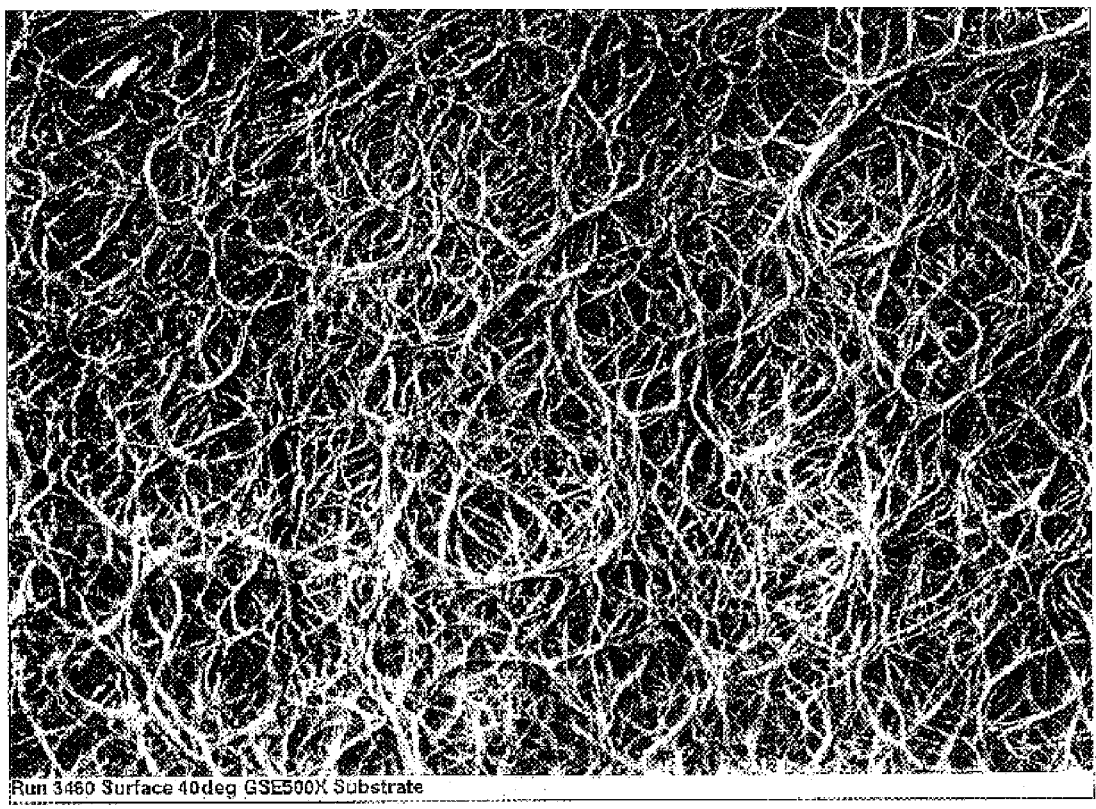
FIG. 5 is an SEM micrograph of one major surface of the unimpregnated substrate of the composite membrane of FIG. 3.

FIGS. 3 and 4 are SEM micrographs (500×) of a sample of the composite membrane prepared as described. FIG. 3 is an SEM micrograph of the surface of the composite membrane corresponding to the surface of the substrate which was brought into contact with the Nafion® solution. Note that it appears to be a dense film, substantially free of discontinuities or pinholes on its surface. FIG. 4 is an SEM micrograph of the other major surface of the composite membrane. As is readily seen in FIG. 4, this side of the composite membrane is substantially porous, and in fact is virtually indistinguishable from the SEM micrograph of the unimpregnated substrate, shown in FIG. 5.

EXAMPLE 3

Residual porosity measurements were carried out on a Micromeritics Autopore III 9400 mercury porosimeter (Micromeritics, Norcross, Ga., USA), using a 5 ml solid with 0.392 ml stem penetrometer (SN: 07-1-092). Five (5) 2 cm×20-cm strips of composite membranes prepared as described in Example 2 were coiled together and placed in the penetrometer.

The test parameters were as follows: (1) the penetrometer was evacuated to 50 $\mu$m Hg, followed by 5 min unrestricted evacuation; (2) the penetrometer was filled with mercury at 0.73 psia (5 kPa); the apparatus was equilibrated at low pressure to 30 psia (200 kPa) for 10 sec; (3) followed by equilibration at high pressure to 15,000 psia (1.0×10⁵ kPa) for ten seconds; (4) then the volume occupied by the sample was recorded at two target pressures, namely, 40 psia (275 kPa) and 140 psia (965 kPa).

The change in volume occupied by the sample at the two pressures is the total collapse volume of the sample. This measured collapse (corrected for the decrease in volume for the dense ion exchange layer, where present) is the void volume within the material. The residual porosity within the substrate is the void volume divided by the initial volume of the substrate.

A sample calculation:

$$P_{res} = 100\% \left( \frac{V_{voids}}{V_{pfs}} \right) \text{ and}$$

$$V_{pfs} = (V_{total})(x)$$

where:
- $P_{res}$ is the residual porosity of the substrate layer,
- $V_{voids}$ is the void volume (decrease in volume of the sample between 40 psia (275 kPa) and 140 psia (965 kPa), corrected for the observed decrease in volume for the dense cast material),
- $V_{pfs}$ is the initial volume, at 40 psia (275 kPa), of the substrate layer,
- $V_{total}$ is the total initial volume, at 40 psia (275 kPa), of the sample, and
- x is the relative volume of the substrate layer to total volume of the sample as measured, for example, by SEM.

The relative volume of the substrate layer to total membrane volume can be estimated by a variety of methods. For example, depending on the composition of the present membrane, the dense film layer may be physically separated from the substrate layer and the volume or thickness of each layer can be measured. As a further example, cross-sectional SEM images may be obtained for the sample, and the relative and absolute thicknesses (and therefore volumes) of the two clearly distinguishable layers can be measured. Of course, where the composite membrane does not comprise a dense film layer, the initial volume of the substrate layer will be equal to the total initial volume of the composite membrane (i.e., x=1).

The results of the mercury porosimetry measurements are presented in Table 1. Note that, for each composite membrane tested, the relative volume of the substrate layer to total membrane volume was determined by reference to cross-sectional SEMs obtained for each membrane (data not shown), as outlined above.

TABLE 1

Mercury Porosimetry Results

| Sample | 1 | 2 | 3 | 4 | 5 |
|---|---|---|---|---|---|
| $V_{voids}$ (ml) | 0.034 | 0.034 | 0.033 | 0.036 | 0.036 |
| $V_{total}$ (ml) | 0.420 | 0.256 | 0.215 | 0.230 | 0.184 |
| X | 0.50 | 0.69 | 0.75 | 0.83 | 1.00 |
| $V_{pfs}$ (ml) | 0.210 | 0.176 | 0.161 | 0.191 | 0.184 |
| $P_{res}$ | 16% | 19% | 20% | 19% | 20% |

As shown in Table 1, the present composite membrane has a residual porosity of greater than 10%, and greater than 15% in the samples tested, regardless of the thickness of the additional dense film layer, where present.

EXAMPLE 4

Sections (approximately 23 cm×23 cm) of a composite membrane prepared as described in Example 2, above, were each bonded to two catalyzed carbon fiber paper electrodes under 20 barg pressure at 140° C., such that the dense polymer layer was facing the cathode. The resulting membrane electrode assemblies were tested in Ballard Mark IV single cell fuel cells. One fuel cell was operated on hydrogen and oxygen (A), the other was operated on hydrogen and air (B). The following operating conditions applied to the fuel cells in which the composite membrane was tested:

| | |
|---|---|
| Temperature: | 80° C. |
| Reactant inlet pressure: | 3.02 bara (all reactants) |
| Reactant stoichiometries: | 2.0 O₂ |
| | 2.0 air |
| | 1.5 H₂ |

Figure 6:
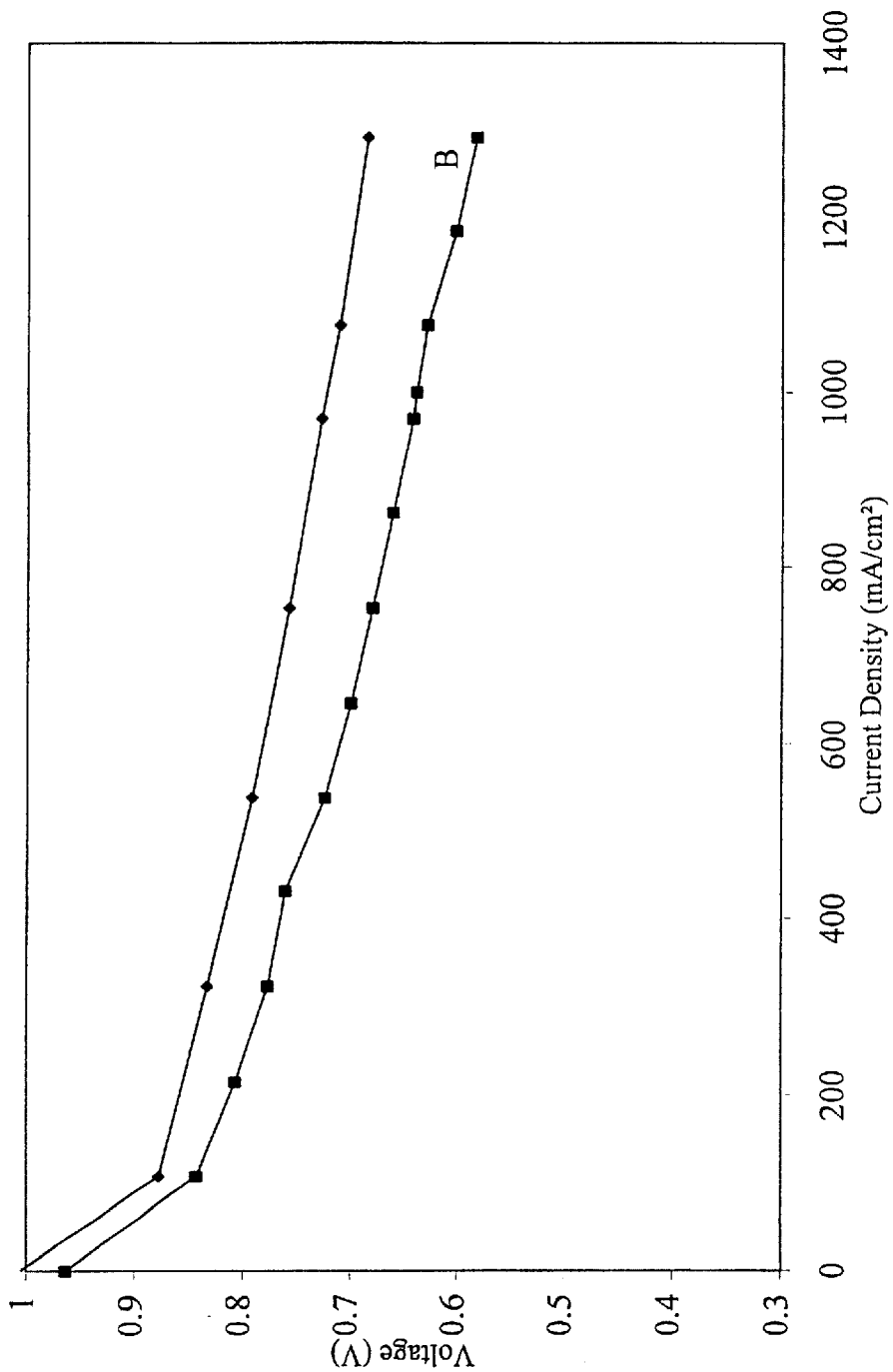
FIG. 6 is a plot of the output voltage versus current density for fuel cells incorporating the present composite membrane.

FIG. 6 is a plot of the output voltage versus current density for each of the fuel cells A and B of Example 4.

EXAMPLE 5

Membrane electrode assemblies were prepared as described in Example 4, above, and were tested in a Ballard Mark 10 fuel cell stack under the following operating conditions.

| | |
|---|---|
| Temperature: | 65° C. |
| Reactant inlet pressure: | 1.2 bara |
| Reactant stoichiometries: | 2.0 air |
| | 1.3 H₂ |

Figure 7:
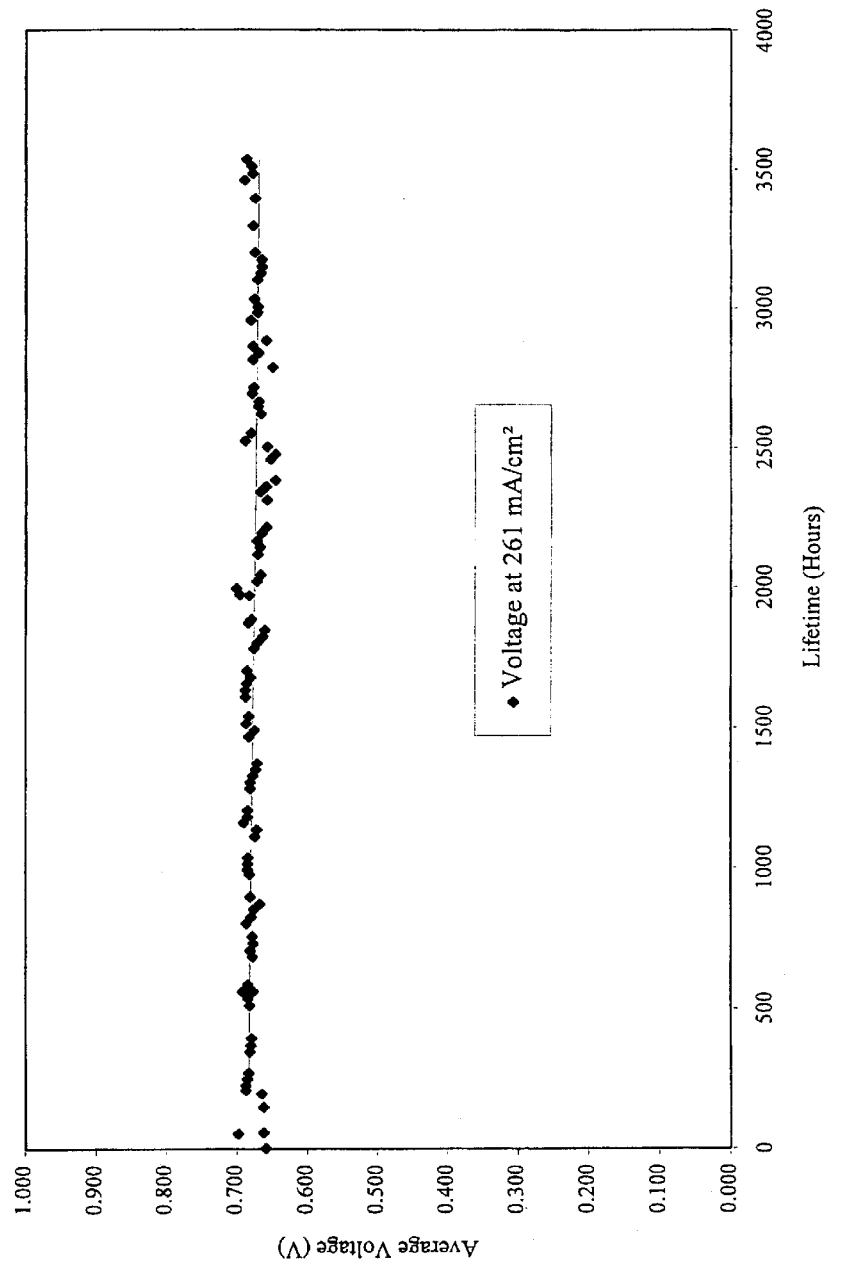
FIG. 7 is a plot of the average voltage versus hours of operation for a fuel cell stack having fuel cells incorporating the present composite membrane.

FIG. 7 is a plot of the average voltage versus hours of operation for the fuel cells in the stack, operating at 261 mA/cm².

COMPARATIVE EXAMPLE 6

Two membrane electrode assemblies (C and D) were prepared as described in Example 4, except that dense Nafion® 112 was used in place of the composite membrane in D. The membrane electrode assemblies were tested in Ballard Mark IV single cell fuel cells under the same operating conditions described in Example 4. Both fuel cells were operated on hydrogen and air.

Figure 8:
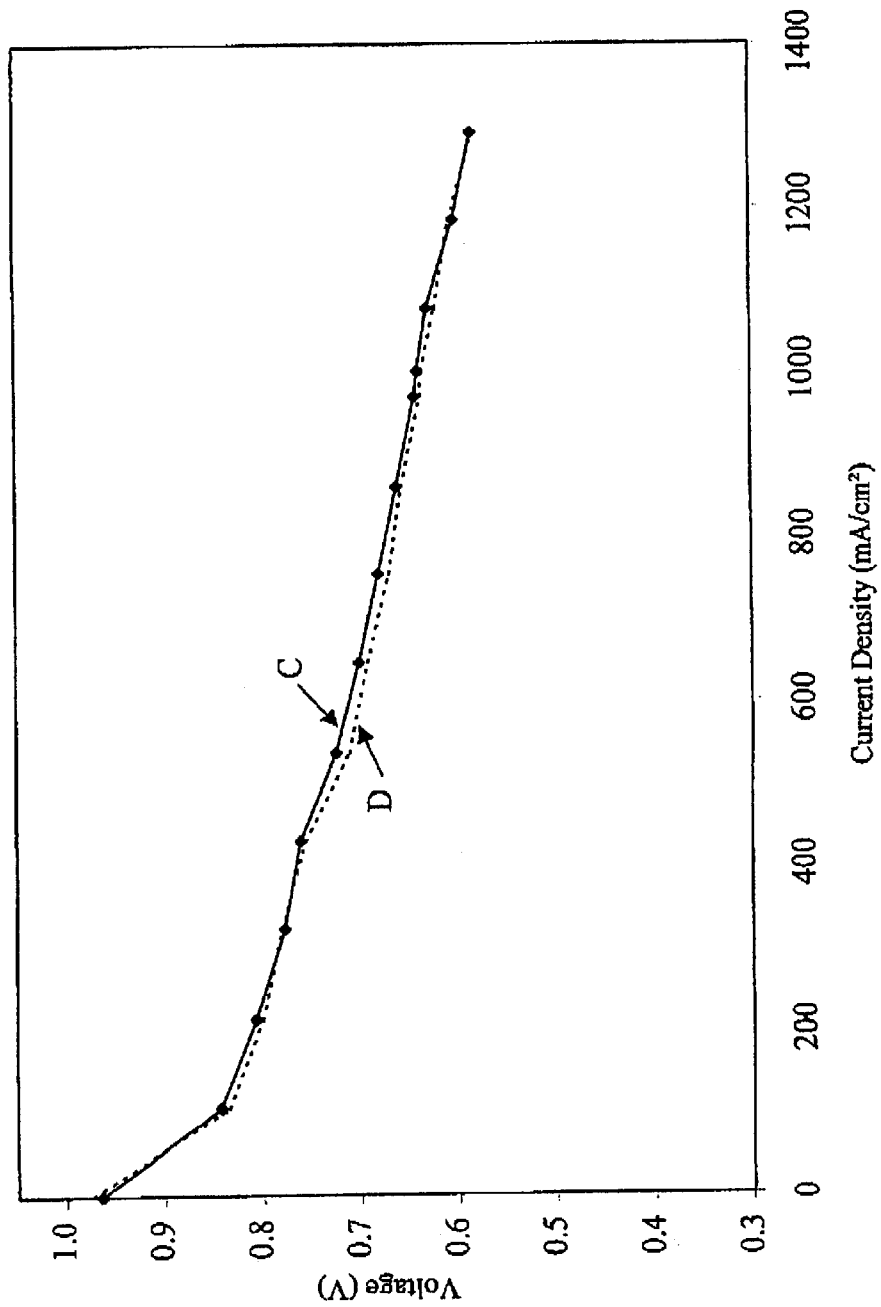
FIG. 8 is a plot of the output voltage versus current density for fuel cells incorporating the present composite membrane and a Nafion® 112 membrane.

FIG. 8 is a plot of the output voltage versus current density for each of fuel cells C and D in Comparative Example 6.

As shown in FIG. 8, fuel cells incorporating the present composite membrane exhibit performance at least comparable to fuel cells employing dense membranes. Furthermore, as illustrated in FIG. 7, fuel cells incorporating the present composite membrane were operated for 3500 hours without any appreciable drop in performance.

This result is surprising in view of U.S. Pat. Nos. 5,547,551, 5,599,614 and 5,635,041, for example, which indicate that for fuel cell applications it is important that composite membranes have no porous surfaces, and that the interior volume of the porous substrate is filled with ion exchange material. A person of ordinary skill in the art would expect a composite membrane having residual porosity and a porous surface to exhibit poorer performance compared to either dense membranes or conventional composite membranes. On the contrary, the present membranes provide at least comparable performance in fuel cells, and offer a cost savings compared to conventional ion exchange membranes through a more efficient use of the expensive polymer.

Furthermore, the present method for making the present composite membranes is simpler and can be more efficient and less costly than conventional methods of making composite membranes.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications that incorporate those features coming within the scope of the invention.

What is claimed is:

1. An asymmetric composite membrane for use in a fuel cell membrane electrode assembly, the composite membrane comprising:
   (a) a porous polymeric substrate;
   (b) an impregnant comprising a cation exchange material, the impregnant partially filling the substrate such that the substrate comprises a first region having pores substantially filled with the impregnant, and a second substantially porous region; and
   (c) a dense surface layer comprising the cation exchange material, the dense layer contiguous with the first region of the substrate,
   wherein the substrate has greater than 10% residual porosity, and the composite membrane is substantially gas impermeable and has a substantially porous major surface.

2. The composite membrane of claim 1, further comprising an electrocatalyst layer associated with at least one of the major surfaces of the membrane.

3. The composite membrane of claim 1, further comprising an electrochemically inert, hygroscopic material.

4. The composite membrane of claim 3 wherein the hygroscopic material comprises silica.

5. The composite membrane of claim 3 wherein the hygroscopic material is a hydrogel.

6. The composite membrane of claim 1 wherein the substrate comprises a polymer selected from the group consisting of polyolefins, polyamides, polycarbonates, cellulosics, polyacrylates, copolyether esters, polyamides, polyarylether ketones, polysulfones, polybenzimidazoles, fluoropolymers, and chlorinated polymers.

7. The composite membrane of claim 1 wherein the substrate comprises a polymer selected from the group consisting of polyethylene, polypropylene, polyvinylidene fluoride, polytetrafluoroethylene, poly(ethylene-co-tetrafluoroethylene), and poly(tetrafluoroethylene-co-hexafluoropropylene).

8. The composite membrane of claim 1 wherein the substrate comprises expanded polytetrafluoroethylene.

9. The composite membrane of claim 1 wherein the substrate comprises ultra-high molecular weight polyethylene.

10. The composite membrane of claim 1 wherein the substrate has greater than 15% residual porosity.

11. The composite membrane of claim 1 wherein the substrate has between about 15% and about 20% residual porosity.

12. The composite membrane of claim 1 wherein the impregnant comprises at least one cation exchange material selected from the group consisting of perfluorosulfonic acid polymers, perfluorophosphonic acid polymers, styrenic cation exchange polymers, sulfonated polyarylether ketones, sulfonated polysulfones, bis(fluoroalkylsulfonyl)imides, and (fluoroalkylsulfonyl)(fluorosulfonyl)imides.

13. The composite membrane of claim 1 wherein the impregnant comprises a perfluorosulfonic acid polymer.

14. The composite membrane of claim 1 wherein the impregnant comprises an $\alpha,\beta,\beta$-trifluorostyrenic cation exchange polymer.

15. The composite membrane of claim 1 wherein the impregnant further comprises an electrocatalyst.

16. The composite membrane of claim 1 wherein the impregnant further comprises an electrochemically inert, hygroscopic material.

17. The composite membrane of claim 16 wherein the hygroscopic material comprises silica.

18. The composite membrane of claim 16 wherein the hygroscopic material is a hydrogel.

19. A membrane electrode assembly comprising a composite membrane, the composite membrane comprising:
   (a) a porous polymeric substrate;
   (b) an impregnant comprising a cation exchange material, the impregnant partially filling the substrate such that the substrate comprises a first region having pores substantially filled with the impregnant, and a second substantially porous region; and
   (c) a dense surface layer comprising the cation exchange material, the dense layer contiguous with the first region of the substrate, wherein the substrate has greater than 10% residual porosity, and the composite membrane is substantially gas impermeable and has a substantially porous major surface.

20. The membrane electrode assembly of claim 19, further comprising an anode and a cathode, wherein the composite membrane is interposed between the anode and cathode and the dense surface layer of the composite membrane faces the cathode.

21. A fuel cell comprising a composite membrane, the composite membrane comprising:
   (a) a porous polymeric substrate;
   (b) an impregnant comprising a cation exchange material, the impregnant partially filling the substrate such that the substrate comprises a first region having pores substantially filled with the impregnant, and a second substantially porous region; and
   (c) a dense surface layer comprising the cation exchange material, the dense layer contiguous with the first region of the substrate, wherein the substrate has greater than 10% residual porosity, and the composite membrane is substantially gas impermeable and has a substantially porous major surface.

22. The fuel cell of claim 21, further comprising an anode and a cathode, wherein the composite membrane is interposed between the anode and cathode and the dense surface layer of the composite membrane faces the cathode.

* * * * *